N. H. PUTNEY.
Pendulum-Scales for Weighing.
No. 198,815. Patented Jan. 1, 1878.
BEST AVAILABLE COPY
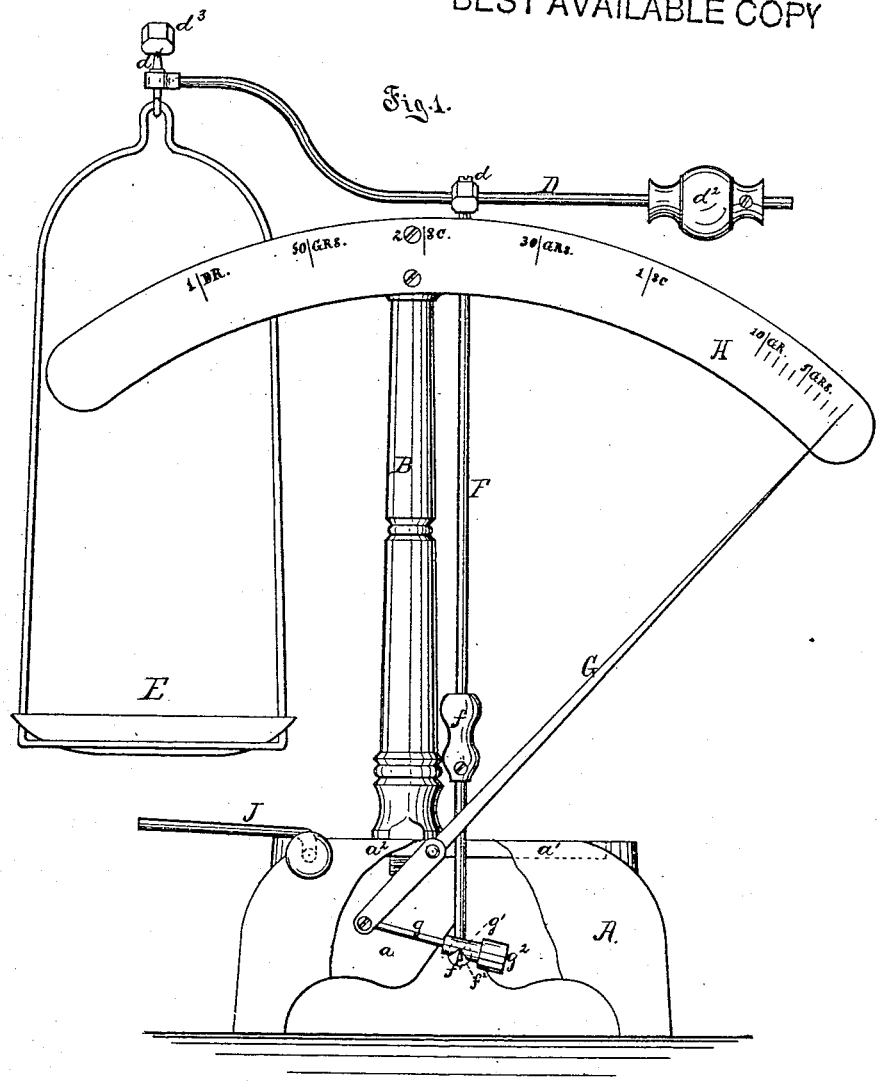
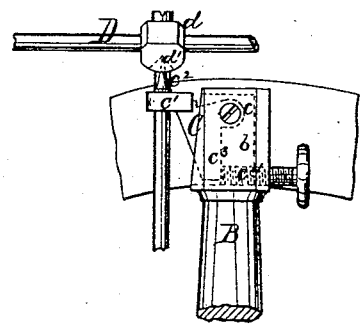

UNITED STATES PATENT OFFICE.

NELSON H. PUTNEY, OF BRIDGEPORT, CONNECTICUT.

IMPROVEMENT IN PENDULUM-SCALES FOR WEIGHING.

Specification forming part of Letters Patent No. 198,815, dated January 1, 1878; application filed May 31, 1877.

*To all whom it may concern:*

Be it known that I, NELSON H. PUTNEY, of Bridgeport, county of Fairfield, in the State of Connecticut, have invented an Improved Scales, of which the following is a full, clear, and exact description, reference being had to the accompanying drawing, forming part of this specification.

My invention relates to a scales adapted to the weighing accurately of small quantities of any substance, and calculated for use by druggists and jewelers, &c.; and it consists in a weight rigidly suspended from a beam, and at right angles thereto, the deflection of which weight from its state of rest is communicated to a pointer by a suitable mechanism, the said pointer ranging over a dial or index, as hereinafter set forth, and more particularly recited in the claim.

Figure 1 is a front elevation of a scales embodying my invention. Fig. 2 is a view in detail of the devices I employ to secure the suspension of the weight in a vertical position when the beam is horizontal and the pointer indicates a given or desired degree or place on the dial.

A is the standard or base, which is made with an interior hollow or chamber space, $a$. In this chamber a portion of the mechanism is arranged, and is thus protected from contact with exterior objects. From the base rises a column or pillar, B, upon which are arranged other parts of the mechanism. The upper end of the column B is slotted at $b$, and in this slot, swinging on the pivot $c$, is arranged the arm C, upon the outer end of which, mounted on a small platform, $c^1$, carried by the said arm, are the points $c^2$. The arm has the downwardly-extending lug $c^3$ in the slot which rests against the end of the screw $c^4$, which passes out on the other side of the column to the rear of the slot. By means of this screw the platform $c^1$ may, by the swinging of the arm away from or toward the column on its pivot $c$, be carried either down toward or up away from the column.

D is the beam, which, by means of a yoke, $d$, fixed about midway between its ends, having suitable recesses $d^1$ in its under face, is suspended on the points $c^2$. The beam is balanced accurately by means of the weight $d^2$, which is so placed on one arm of the beam that it exactly counterbalances the weight of the scale-pan E and its supporting and suspending devices, it being suspended to the end of the beam by a yoke, $d^3$, similar to the yoke $d$, resting on points $d^4$.

At the fulcrum-point of the beam D—that is, the point where the beam is suspended by the yoke $d$, is secured an arm, F, extending rigidly from the beam, and at right angles to it, when the beam is balanced in a horizontal position. The arm F extends downward through a slot, $a^1$, in the upper portion of the standard, into the chamber $a$ of said standard. Upon this arm is fixed the weight $f$, the deflection of which from its position in a state of rest, suspended from the beam D on the arm F, is registered upon the dial hereinafter described, and indicates the weight of the substance in the scale-pan E. In a slot, $a^2$, in the upper part of the standard, is pivoted a pointer, G, the long arm of which ranges over a dial or index, H, which is mounted on the column B, as shown. The short arm of the pointer extends downward into the chamber $a$, and has hinged or pivoted at its extremity the arm $g$, which, by means of a notch, $g^1$, engages a knife-edge, $f^1$, carried by an arm, $f^2$, which is fixed upon and extends transversely the end of the long arm F toward the arm $g$ in the chamber $a$. The extremity of the arm $g$ is weighted as at $g^2$, so that the notch is held in engagement with its knife-edge. At J is shown a device which may be employed to bring the scale-pan to a state of rest.

Now it is evident that when the index of the weights to be determined in using the scale have been placed upon the dial H, the position of the weight $f$, suspended on the arm F, being at the same time ascertained and fixed thereat, the imposing of any substance, in very small quantity even, upon the scale-pan, will deflect the weighted arm F from its state of rest, causing a movement of the pointer G across the dial, and the registering of the weight of the substance in the pan E. For the reason that the deflection of the weighted arm F, for even the least distance, will be felt by and indicated by the attached pointer, my scales are adapted to determine the weight of small quantities of any substance.

By means of the adjustable arm C, on which the beam is suspended, the said beam, arm F, and pointer G may be brought into such relation with each other and the dial, that the beam will be horizontally balanced, the weighted arm vertically suspended, while the pointer indicates zero upon the dial, and any inequalities or changes in the level of the base or the place upon which the base rests thus overcome.

What I claim as my invention, and desire to secure by Letters Patent, is—

In combination, the chambered base A, column B, balanced beam D on adjustable fulcrum-arm C, and having the rigidly-suspended weighted arm F, the pivoted pointer G, with its hinged arm $g$ engaging at notch $g^1$ with the knife-edge $f^1$ on arm $f^2$, all arranged to operate as and for the purpose specified.

NELSON H. PUTNEY.

Witnesses:
V. R. C. GIDDINGS,
FRANK J. HUGHES.